United States Patent [19]
Kohnke et al.

[11] Patent Number: 5,718,738
[45] Date of Patent: Feb. 17, 1998

[54] METHOD FOR MAKING CONTINUOUSLY CHIRPED FIBER BRAGG GRATINGS

[75] Inventors: Glenn Eric Kohnke, Johnson City, N.Y.; Thomas A. Strasser, Chatham, N.J.

[73] Assignee: Lucent Technologies Inc., Murray Hill, N.J.

[21] Appl. No.: 740,745

[22] Filed: Nov. 4, 1996

[51] Int. Cl.[6] .................................................. C03B 37/00
[52] U.S. Cl. .............................. 65/31; 65/111; 216/12; 216/24; 216/80; 216/47
[58] Field of Search .......................... 65/392, 425, 31, 65/111; 216/12, 24, 80, 48

[56] References Cited

U.S. PATENT DOCUMENTS

| | | | |
|---|---|---|---|
| 3,676,914 | 7/1972 | Fiore | 216/12 |
| 5,116,461 | 5/1992 | Lebby | 216/24 |
| 5,620,495 | 4/1997 | Aspell | 65/425 |
| 5,636,304 | 6/1997 | Mizrahi | 385/37 |

*Primary Examiner*—John Hoffmann
*Attorney, Agent, or Firm*—Mathews, Collins, Shepherd & Gould, P.A.

[57] ABSTRACT

In accordance with the invention, a continuously chirped fiber Bragg grating is made by fabricating a continuously chirped phase mask and using the mask to write a Bragg grating on a parallel fiber. The chirped phase mask is made by exposing a photoresist-coated mask substrate to two interfering beams: one a collimated beam and the other a beam reflected from a continuously curved mirror. After etching, the resulting phase mask can be used to write a chirped fiber grating having a continuously varying grating period without physical modification of the fiber. The resulting fiber grating has a widened bandwidth and uniform dispersive delay characteristics useful for dispersion compensation in critical telecommunications applications.

1 Claim, 4 Drawing Sheets

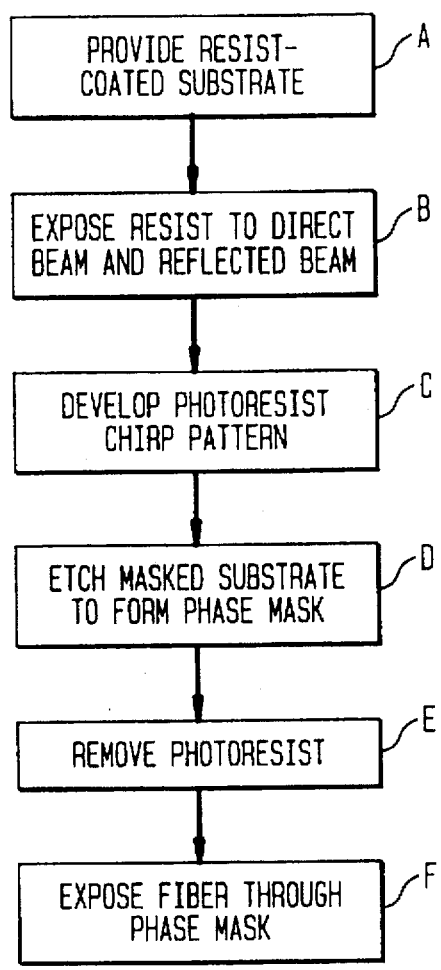
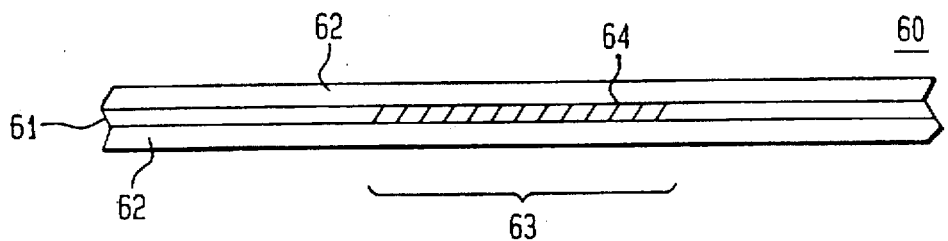

METHOD FOR MAKING CONTINUOUSLY CHIRPED FIBER BRAGG GRATINGS

FIELD OF THE INVENTION

This invention relates to optical fiber Bragg gratings and, in particular, to a method and apparatus for making continuously chirped Bragg gratings of enhanced reliability.

BACKGROUND OF THE INVENTION

Optical fibers are key components in modern telecommunications systems. Optical fibers are thin strands of glass capable of transmitting an optical signal containing a large amount of information over long distances with very low loss. In essence, an optical fiber is a small diameter waveguide characterized by a core with a first index of refraction surrounded by a cladding having a second (lower) index of refraction. Light rays which impinge upon the core at an angle less than a critical acceptance angle undergo total internal reflection within the fiber core. These rays are guided along the axis of the fiber with minimum attenuation. Typical optical fibers are made of high purity silica with minor concentrations of dopants to control the index of refraction.

Optical fiber Bragg gratings are important elements for selectively controlling specific wavelengths of light within an optical fiber. A typical Bragg grating comprises a length of optical fiber including a plurality of perturbations in the index of refraction substantially equally spaced along the fiber length. These perturbations selectively reflect light of wavelength $\lambda$, equal to twice the spacing $\Lambda$ between successive perturbations, i.e. $\lambda=2\Lambda$. The remaining wavelengths pass essentially unimpeded. Such Bragg gratings have found use in a variety of applications including filtering, stabilization of semiconductor lasers, reflection of fiber amplifier pump energy, and compensation for fiber dispersion.

Conventional fiber Bragg gratings are conveniently fabricated by providing fiber with one or more dopants sensitive to ultraviolet light, such as fibers having cores doped with germanium oxide, and exposing the fiber at periodic intervals to high intensity ultraviolet light from an excimer laser. The ultraviolet light interacts with the photosensitive dopant to produce long-term perturbations in the local index of refraction. The appropriate periodic spacing of perturbations to achieve a conventional grating can be obtained by use of a physical mask, a phase mask, or a pair of interfering beams.

A difficulty with conventional fiber Bragg gratings is that they are narrow in the bandwidth. They selectively reflect only light in a narrow bandwidth centered around $\lambda=2\Lambda$. However in many applications, such as the reflection of laser amplifier pump energy, it is desirable to produce wide bandwidth gratings that affect a larger wavelength region than can be obtained with a conventional single-period grating. In other applications, such as dispersion compensation, it is desirable to provide a wavelength-dependent time delay to a propagating signal with a finite bandwidth.

It has been recognized that a technique called chirping can be used to produce a grating which reflects a broadened bandwidth and the reflected band exhibits wavelength-dependent time delay. The chirping technique involves varying the spacing between successive perturbations from a constant spacing $\Lambda_0$ to a spacing S which increases (or decreases) for subsequent perturbations. Bandwidth of the reflected signal increases because the chirped device has a wider range of spacings. Wavelength-dependent time delay is introduced in the reflected signal because different wavelengths travel different pathlengths before encountering the spacing needed to reflect them. Such a chirped grating, however, is not easily made.

A continuously chirped grating would add or subtract increasing spatial increments for each successive spacing between perturbations. Ideally the increments increase linearly, but other monotonic functions such as quadratic or square root variation are also useful for some applications. Efforts have been made using state-of-the-art e-beam lithography to prepare a phase mask that will produce a continuously chirped grating. However the phase masks produced made only an approximation of the continuous grating referred to as a "step-chirped" grating. Specifically they produced gratings having numerous sections (steps), each step having many perturbations at constant spacing. The spacing varied only from one step to another, not between successive perturbations. Such step-chirped gratings can present phase discontinuities at the phase boundaries between steps and fail to provide the continuous variation of delay with wavelength needed for dispersion compensation in critical telecommunications applications.

Other efforts to make a chirped grating involve physically modifying the fiber to effect chirping. For example the fiber can be bent, stressed or tapered before or after applying otherwise conventional processes for writing the grating, See, for example, Q. Zhang et al., "Linearly and Nonlinearly Chirped Bragg Gratings Fabricated on curved Fibers", *Optics Letters*, Vol. 20, No. 10, p. 1122 (1995). The difficulty with these approaches, however, is that the tapering, stressing and bending are deleterious to the fiber and produce products of reduced reliability. They also present problems of reproducibility. Accordingly there is a need for chirped fiber Bragg gratings of enhanced reliability and for a method and apparatus for making such gratings.

SUMMARY OF THE INVENTION

In accordance with the invention, a continuously chirped fiber Bragg grating is made by fabricating a continuously chirped phase mask and using the mask to write a Bragg grating on a straight, parallel fiber. The chirped phase mask is made by exposing a photoresist-coated mask substrate to two interfering beam portions: one is a first portion of a collimated beam and the other is second portion of the beam reflected from a continuously curved mirror. The resulting phase mask can be used to write a chirped fiber grating having a continuously varying grating period without physical modification of the fiber. The resulting fiber grating has a widened bandwidth and uniform dispersive delay characteristics useful for dispersion compensation in critical telecommunications applications.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIG. 1 is a block diagram of the steps in making a continuously chirped fiber Bragg grating of enhanced reliability;

FIG. 5 is a schematic cross section of a continuously chirped fiber Bragg grating;

Figure 2:
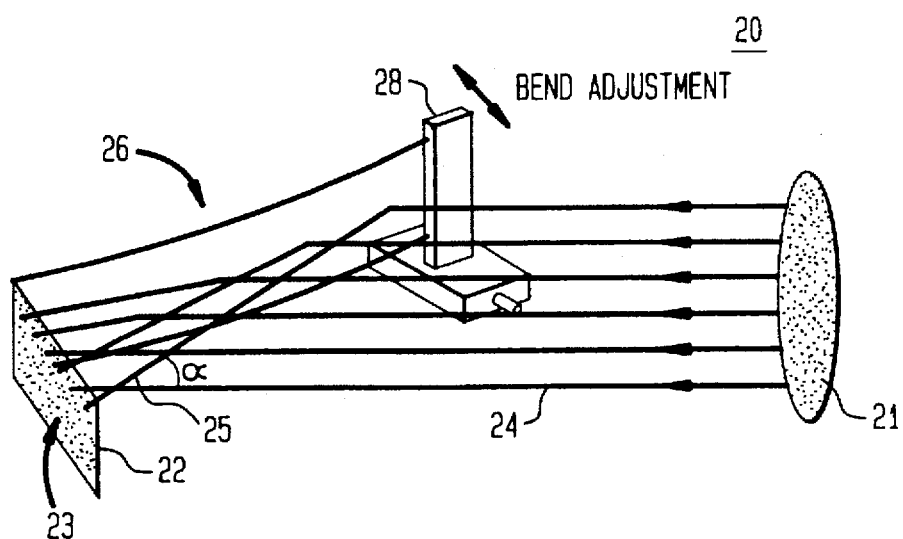
FIG. 2 is a schematic view of apparatus useful in fabricating a continuously chirped phase mask.

It is to be understood that these drawings are for purposes of illustrating the concepts of the invention and, except for the graphs, are not to scale.

DETAILED DESCRIPTION

Referring to the drawings, FIG. 1 is a block diagram of the steps in making a continuously chirped optical fiber Bragg grating of enhanced reliability. The initial group of steps relate to the fabrication of a continuous chirped phase mask for the fiber and wavelength of interest, and the final step is writing the grating in the fiber.

The first step shown in Block A of FIG. 1 is to provide a substrate for the phase grating having a photoresist-coated planar surface. A typical substrate is a rectangular plate of fused silica having dimensions on the order of 30×60×3 mm and coating of photoresist (such as Shipley S1400®) approximately 0.4 µm thick on a major surface.

As shown in block B, the next step is to expose the photoresist to a pair of interfering light beams: one a collimated beam and the other a reflection of the collimated beam from a continuously curved mirror, in order to expose a continuously chirped grating pattern in the photoresist.

FIG. 2 schematically illustrates a preferred exposure system 20 for making the chirped phase masks. The system comprises a source (not shown) of coherent light, a collimating lens 21 for directing the light in two beams onto a photoresist-coated surface 22 of substrate 23. The first beam 24 is the direct collimated beam, and the second beam 25 is the portion of the collimated beam reflected from curved mirror 26. The two beams interfere at the photoresist surface 22. The curved mirror should be continuously curved in the pertinent region. The curvature can be convex, as shown, or concave.

The coherent exposure beam can be provided by an Ar-ion laser operating at 457.9 nm. The mirror 26 can be a flexible mirror such as a silicon wafer approximately 10 cm in length. The assembly of mirror and substrate can be mounted on a stepping motor controlled rotation stage, not shown, with 0.001 degree resolution in order to precisely control the angle of incidence with the exposure beam. The substrate 23 can be mounted on a linear translation stage (not shown) to allow for multiple grating exposures, and the amount of mirror bend can be controlled with a bar 28 mounted on a translation stage. The stages can be computer controlled and provide a highly reproducible method of producing multiple gratings on a single substrate.

In operation, the incoming collimated beam is split in half about the vertical axis. One-half the wavefront remains collimated while the other half is transformed into a diverging wavefront by reflection from the curved mirror 26. The grating period produced by the interfering beams at the substrate 23 is given by, $$\Lambda_{pm} = \frac{\lambda}{2\sin\left(\frac{\alpha}{2}\right)}$$

where $\lambda$ is the interferometer exposure wavelength and $\alpha$ is the angle between the two beams.

Since $\alpha$ varies along the length of the exposure plane where the two beams interfere, the grating period becomes a function of position on the phase mask and is continuously chirped. Moreover, using a flexible curved mirror, the amount of chirp of the grating period can be varied by adjusting the bend of the mirror.

An advantage of the method and apparatus of FIG. 2 is that curved mirror 26 can be flexible, permitting variation of the amount of chirping. The amount of chirp is a function of both the mirror displacement, d, and the period of the grating. Changing d alters the range of angles which interfere with the collimated portion of the beam. Since the substrate/mirror assembly of FIG. 2 is rotated relative to the exposure beam to adjust the period of the phase mask, the maximum attainable grating length is a function of exposure angle for a given beam and mirror size. In addition, equal angular distributions of the reflected beam yield different amounts of chirping depending upon the exposure angle.

Following exposure, the third step is to develop the photoresist (Block C of FIG. 1). Preferably the development endpoint corresponds to the point at which the photoresist has cleared to a 50% duty cycle. Grating period and chirp may be calculated from the measured Littrow angles of the +1 and −1 diffracted orders with a He—Ne laser.

The next step shown in Block D is to etch the photoresist pattern into the substrate to the appropriate depth to form a phase mask with a continuously chirped surface relief grating. The substrate is preferably etched with $CHF_3$ in a reactive ion etch chamber to a depth which corresponds to a $\pi$ phase shift at the UV exposure wavelength. The patterned photoresist is then removed from the silica substrate in step E as by conventional wet chemical processing.

Figure 3:
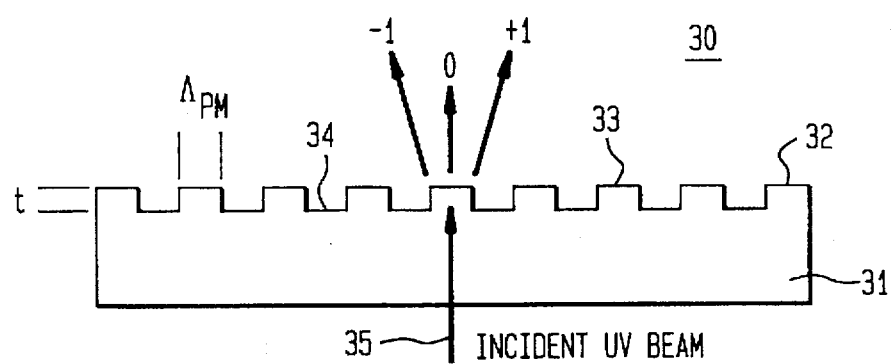
FIG. 3 is a schematic cross section of a continuously chirped phase mask useful in practicing the method of FIG. 1.

FIG. 3 illustrates the resulting continuously chirped phase mask 30 comprising a substrate 31 having a surface 32 comprising a sequence of alternating thick regions 33 and thin regions 34. This sequence is commonly referred to as a surface relief grating (not to be confused with the fiber grating). The substrate 31 is typically fused silica to permit transmission of ultraviolet (UV) light. In use, an incident beam 35 of UV light is directed onto the mask. The incident beam is broken into many diffracted beams of 2N+1 orders where N is typically between 3 and 5 depending on the phase mask period. The structure is preferably optimized as described below to maximize the light in the ±1 orders or, equivalently, to minimize the −0 th order transmission.

The $0^{th}$-order transmission is determined by the differential thickness t between the thick regions 33 and the thin regions 34. To obtain complete cancellation of the $0^{th}$-order transmission, t must correspond to a phase delay of $\pi$ (180°) for light propagating through fused silica relative to air. The $\pi$ phase shift results in destructive interference for the 0th-order transmitted beam. This thickness $t_\pi$ is given by, $$t_\pi = \frac{\lambda}{2(n-1)}$$

where $\lambda$ is the wavelength of the incident light and n is the refractive index at that wavelength.

The $0^{th}$-order transmission is additionally a function of the duty cycle D of the grating defined as $$D = \frac{a}{\Lambda_{pm}}$$

where $a$ is the width of a thick region 33 and $\Lambda_{pm}$ is the combined width of a thick region 33 and a neighboring thin region 34.

For a square profile phase grating, it can be shown that the $0^{th}$-order transmission efficiency $\eta_o$ is given by, $$\eta_o = 1 + 4D(D-1)\sin^2\left(\frac{\pi t}{2 t_\pi}\right)$$

It is desirable to keep $\rho_o < 0.05$ since the light which is not diffracted reduces the index modulation in a fabricated fiber Bragg grating. For the case of $t=t_\pi$, the duty cycle D is advantageously within $0.39 < D < 0.61$ for $\rho_o < 0.05$. Alternatively, the acceptable thickness variation t for D=0.5 is $0.86\, t_\pi < t < 1.14\, t_\pi$. In practice, the duty cycle is the primary contributor to increased $0^{th}$-order transmission, however it is understood that the compounding effect of imperfect etch depth variation leads to more stringent tolerances than those listed above.

As a numerical example, a phase mask can be designed for use with an exposure wavelength of 244 nm and designed to produce a fiber Bragg wavelength of 1550 nm. Taking n=1.45, the phase mask period for a Bragg wavelength of 1550 nm is $\Lambda_{pm} = 1.069$ μm. The duty cycle variation acceptable for $\rho_o < 0.05$ then corresponds to a thick region width of 0.534 μm±118 nm. The differential thickness is 0.271 μm±38 nm.

Figure 4:
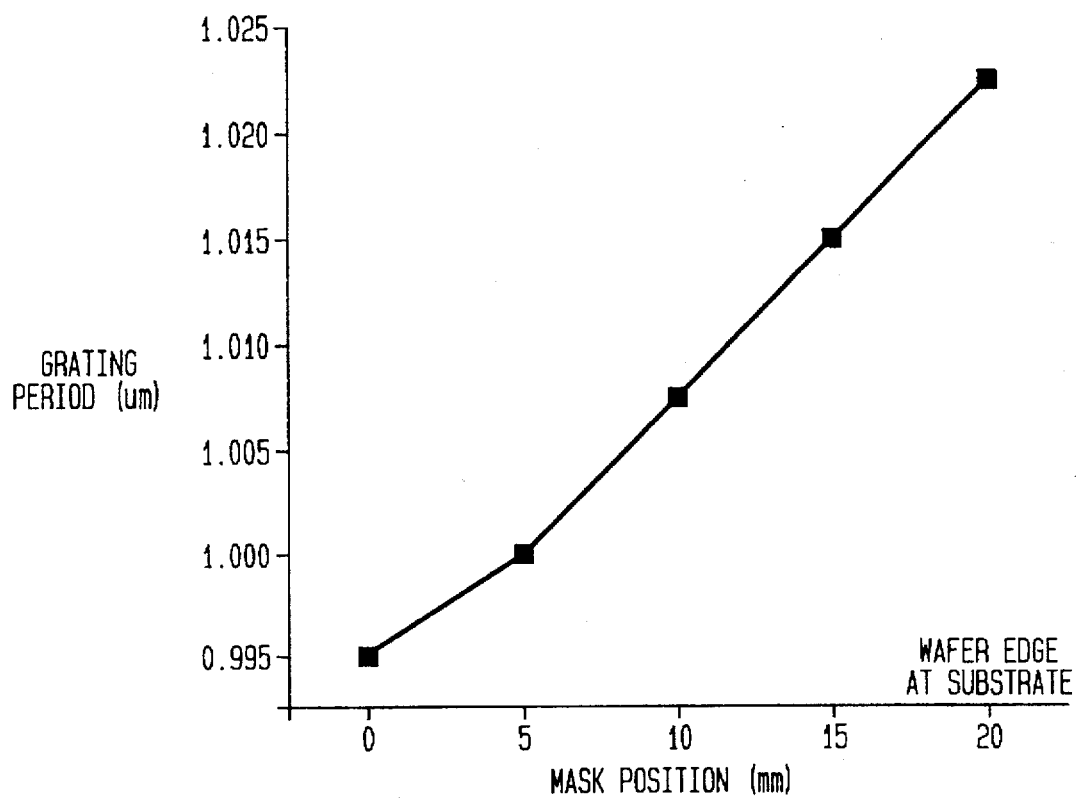
FIG. 4 graphically illustrates the chirp in a phase mask as a function of position along the phase grating.

FIG. 4 is a graphical illustration showing the measured chirp along the length of a 20 mm grating made as described above, for reflection around λ=1480 nm. For broadband gratings, a linear chirp is desirable so the Bragg wavelength change is uniformly distributed along the length. As can be seen from FIG. 4, the chirp profile along the length of the grating is nearly linear.

As shown in block F of FIG. 1, the sixth step in making a fiber grating is to use the chirped phase mask to write the chirped Bragg grating in fiber. A chirped fiber Bragg grating can be fabricated using the chirped phase mask without deleterious modification of the fiber. UV photosensitive optical fiber is simply placed in the region near the phase mask where the two diffracted beams overlap, and the grating is written in the fiber by directing collimated UV light at normal incidence through the mask. The fiber need not be stressed, bent or tapered. It can be straight and parallel to the phase mask for high reproducibility. Typical fiber-to-mask distances are on the order of 200 μm and typical exposure fluences are in the range 100-400 mJ/cm²/pulse.

FIG. 5 is a schematic cross section of the resulting chirped fiber Bragg grating 60 comprising a core 61 with a first index of refraction surrounded by a cladding 62 having a second (lower) index of refraction. The core includes a chirped grating 63 comprising a plurality of index perturbations 64 spaced along a length of the fiber. The grating is intrinsically continuously chirped because the phase mask was continuously chirped due to the use of a continuously curved mirror.

Figure 6:
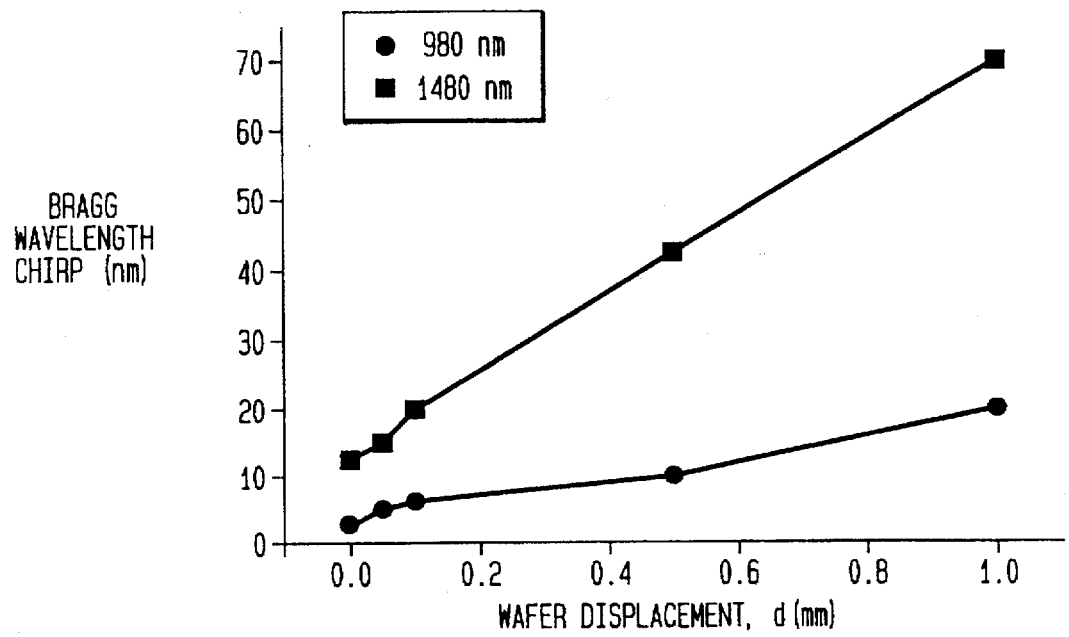
FIG. 6 is a graphical illustration of the chirp in a fiber Bragg grating as a function of the curved mirror displacement used to make the phase mask.

FIG. 6 is a graphical illustration of the fiber Bragg grating wavelength chirp as a function of the curved mirror displacement used in making the chirped phase mask. Curves are shown for Bragg gratings at 980 nm and 1480 nm written in a typical fiber with an effective refractive index of 1.45.

Figure 7:
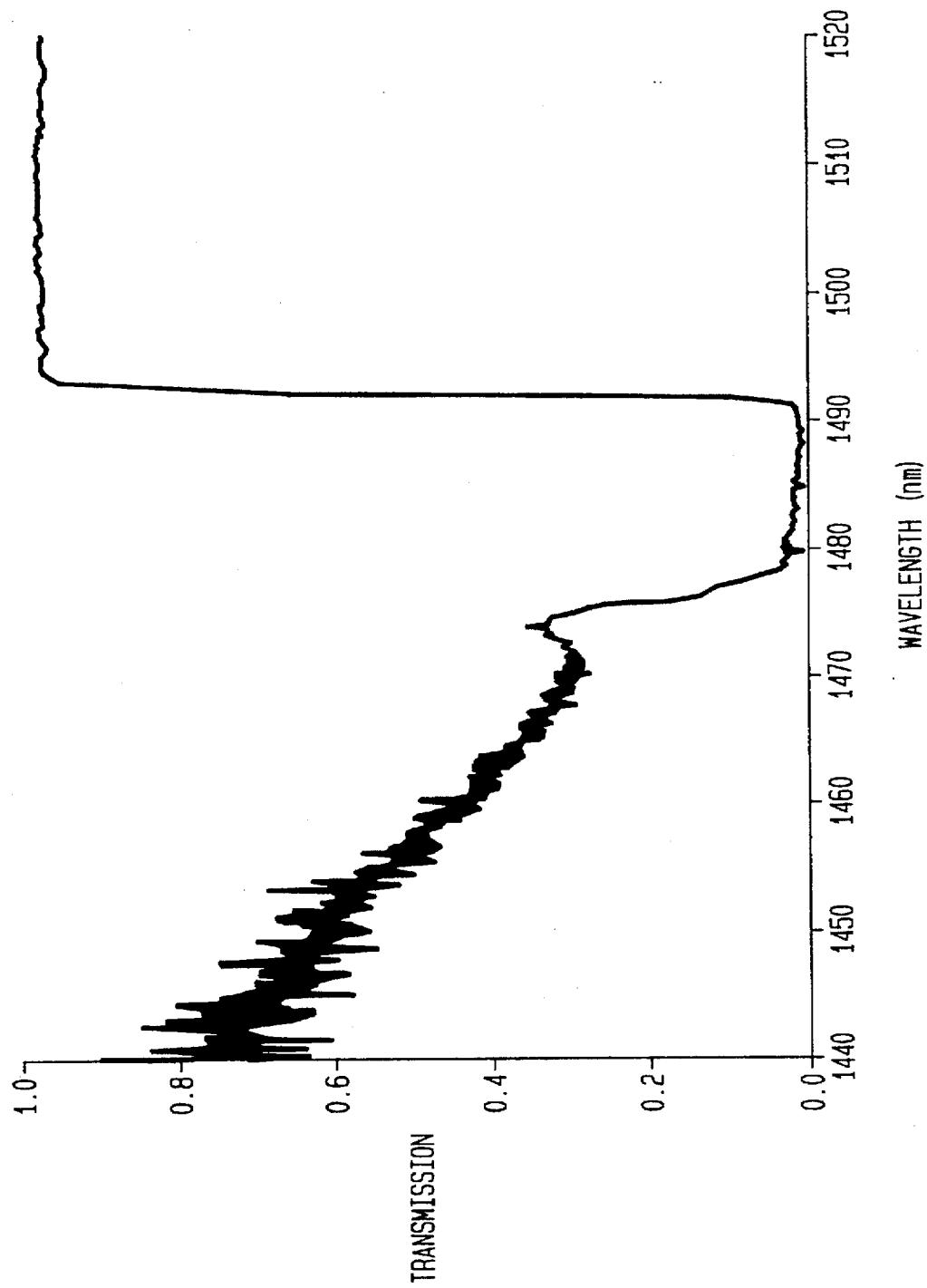
FIG. 7 shows the transmission spectrum of a continuous chirped fiber Bragg grating made by the process of FIG. 1.

As a specific example, a Bragg grating was fabricated using 0.6 cm of a phase mask chirped at 23 nm/cm. FIG. 7 shows a typical transmission spectrum of the device. The extended dip at short wavelengths is due to coupling to radiation modes which occurs in transmission through the grating. When used in reflection, the radiation mode coupling does not occur and light is reflected only for wavelengths within the Bragg grating resonance. The spectrum has a −10 dB width of 14.5 nm which is in agreement with the expected width. Wider bandwidth gratings may be written either by using a larger portion of the phase mask or by increasing the mask chirp.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. A method of making a continuously chirped phase mask comprising the steps of:

providing a substrate comprising UV light transparent material, wherein said substrate includes a planar surface coated with photoresist;

exposing said photoresist to the pattern of light formed by the interference of a first portion of a collimated beam and a second portion of said collimated beam which said second portion is reflected from a continuously curved mirror;

developing said photoresist; and etching said substrate to produce a phase mask having a continuously chirped surface relief grating.

* * * * *